US012551915B2

(12) United States Patent
Rüger et al.

(10) Patent No.: US 12,551,915 B2
(45) Date of Patent: Feb. 17, 2026

(54) PAINT-SUPPLY SYSTEM FOR A COATING INSTALLATION, AND ASSOCIATED OPERATING METHOD

(71) Applicant: Dürr Systems AG, Bietigheim-Bissingen (DE)

(72) Inventors: Alexander Rüger, Murr (DE); Sascha Hermann, Korb (DE); Luis Jimenez Cadenas, Esslingen (DE); Eduard Frühsorger, Zabergeld (DE)

( * ) Notice: Subject to any disclaimer, the term of this patent is extended or adjusted under 35 U.S.C. 154(b) by 18 days.

(21) Appl. No.: 18/418,769

(22) Filed: Jan. 22, 2024

(65) Prior Publication Data

US 2024/0165648 A1 May 23, 2024

Related U.S. Application Data

(63) Continuation of application No. 17/772,570, filed as application No. PCT/EP2020/081577 on Nov. 10, 2020, now Pat. No. 11,890,630.

(30) Foreign Application Priority Data

Nov. 15, 2019 (DE) ..................... 10 2019 130 920.4

(51) Int. Cl.
*B05B 15/20* (2018.01)
*B05B 12/14* (2006.01)
*B05B 15/58* (2018.01)

(52) U.S. Cl.
CPC .......... *B05B 15/20* (2018.02); *B05B 12/1481* (2013.01); *B05B 15/58* (2018.02)

(58) Field of Classification Search
CPC ...................................................... B05B 15/58
See application file for complete search history.

(56) References Cited

U.S. PATENT DOCUMENTS

| | | | |
|---|---|---|---|
| 4,390,126 | A | 6/1983 | Buchholz et al. |
| 7,828,527 | B2 | 11/2010 | Smith et al. |
| 9,089,864 | B2 | 7/2015 | Herre et al. |
| 9,662,672 | B2 | 5/2017 | Herre et al. |

(Continued)

FOREIGN PATENT DOCUMENTS

| | | | |
|---|---|---|---|
| CN | 1105912 | A | 8/1995 |
| DE | 2923906 | C2 | 1/1981 |

(Continued)

OTHER PUBLICATIONS

German Patent and Trademark Office—Office Action mailed Feb. 29, 2024 for related application No. DE 10 2019 130 920.4 (28 pages; with English machine translation).

(Continued)

*Primary Examiner* — Alex A Rolland
(74) *Attorney, Agent, or Firm* — Taft Stettinius & Hollister LLP; Thomas E. Bejin; John W. Carpenter

(57) ABSTRACT

The disclosure relates to a paint supply system for a coating installation (e.g. painting installation) comprising a ring line for circulation of a coating agent, a ring line tapping point in the ring line for extraction of the coating agent from the ring line, a consumer and a tap line leading from the ring line tapping point to the consumer. The disclosure provides a device for alternately moving the coating agent forward and backward in the tap line to avoid settling of the coating agent in the tap line.

6 Claims, 5 Drawing Sheets

(56) References Cited

U.S. PATENT DOCUMENTS

| | | | |
|---|---|---|---|
| 10,016,732 B2 | 7/2018 | Goto et al. | |
| 10,710,108 B2 | 7/2020 | Schwab et al. | |
| 2008/0083371 A1 | 4/2008 | Clifford | |
| 2009/0145976 A1* | 6/2009 | Takeguchi | B05B 9/0423 239/104 |
| 2011/0014371 A1 | 1/2011 | Herre et al. | |
| 2011/0076411 A1 | 3/2011 | Nussbaum | |
| 2012/0286064 A1 | 11/2012 | Chang et al. | |
| 2015/0314315 A1 | 11/2015 | Herre et al. | |
| 2016/0184784 A1 | 6/2016 | Goto et al. | |
| 2017/0066000 A1* | 3/2017 | Schwab | B05B 15/58 |

FOREIGN PATENT DOCUMENTS

| | | |
|---|---|---|
| DE | 102008015258 A1 | 9/2009 |
| DE | 102014004718 A1 | 10/2015 |
| EP | 0842706 A2 | 5/1988 |
| EP | 0639409 A2 | 2/1995 |
| JP | 2012134289 A | 7/2012 |

OTHER PUBLICATIONS

International Search Report and Written Opinion for PCT/EP2020/081577 mailed Feb. 17, 2021 (12 pages; with English translation of International Search Report).
Pavel Svejda: “Prozesse und Applikationsverfahren in der industriellen Lackiertechnik”, Vincentz publishing house 2003 (English abstract provided).
China Stage Intellectual Property Office—Office Action mailed Oct. 28, 2023 for related application No. CN202080079241.3 (22 pages; with English machine translation).
China National Intellectual Property Administration Office Action and Search Report for related application No. CN202080079241.3 mailed Mar. 29, 2024 (24 pages; with English machine translation).
EPO Office Action mailed Jun. 17, 2024 for EP20804510.4 (12 pages; with English machine translation).

* cited by examiner

PAINT-SUPPLY SYSTEM FOR A COATING INSTALLATION, AND ASSOCIATED OPERATING METHOD

CROSS-REFERENCE TO RELATED APPLICATIONS

This application is a US Continuation patent application of, and claims priority to, U.S. patent application Ser. No. 17/772,570, filed on Apr. 28, 2022, which application is a national stage of, and claims priority to, Patent Cooperation Treaty Application No. PCT/EP2020/081577, filed on Nov. 10, 2002, which application claims priority to German Application No. DE 10 2019 130 920.4, filed on Nov. 15, 2019, which applications are hereby incorporated herein by reference in their entireties.

FIELD

The disclosure relates to a paint supply system for a coating installation, in particular for a painting installation for painting motor vehicle body components. Furthermore, the disclosure relates to an operating method for such a paint supply system.

BACKGROUND

In modern painting installations for painting motor vehicle body components, the paint is usually supplied to the consumers (e.g. rotary atomizers) through ring lines, with the paint circulating in the ring lines so that the paint does not settle. The consumers (e.g. rotary atomizers) extract the paint from the ring line at a ring line tapping point via a tap line. The problem here is that the coating circulates in the ring line, but not in the tap line. Thus, if a consumer (e.g. rotary atomizer) is not used for a longer period of time, the coating stands in the associated tap line, which can lead to the coating settling or changing its viscosity during a longer standstill.

A known solution to this problem is to automatically empty the tap lines after a certain period of standstill, which is also referred to as stripping. In this case, the paint in the tap line is disposed of in a recirculation system. However, this known solution to the problem is disadvantageous because it involves paint losses and additional expense.

Another conceivable solution to this problem is to continue the material circulation into the consumer (e.g. rotary atomizer), so that a tap line can be dispensed with altogether. However, this conceivable solution requires two circulation lines for outflow and return instead of a single tap line, and is therefore considerably more complex. In addition, this requires twice the number of paint hoses up to the color changer, so that the number of possible paint supply lines is reduced due to the limited installation space.

From DE 10 2014 004 718 A1, a painting system is known in which, during a color change, paint can be forced from the tap line back into the ring line by pigs in order to minimize the color change losses. However, this has nothing to do with the settling of the paint in the tap line, but serves solely to recover the paint remaining in the tap line.

Furthermore, reference should be made to DE 29 23 906 C2 for the technical background.

DETAILED DESCRIPTION

Figure 1:
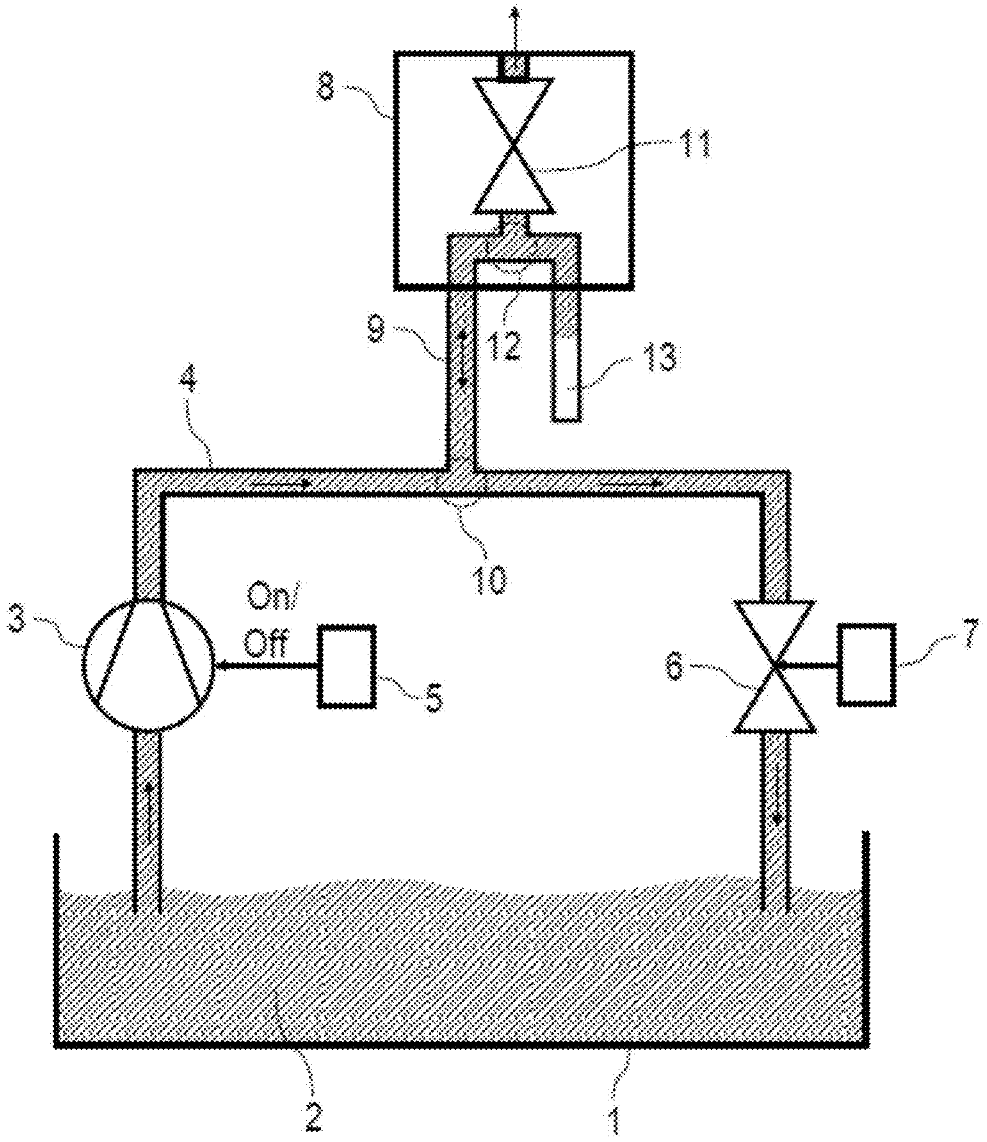
FIG. 1 a schematic representation of a paint supply system according to the disclosure according to a first variant of the disclosure, FIG. 2 a schematic representation of a paint supply system according to the disclosure in accordance with a second variant of the disclosure, FIG. 3A a schematic representation of a further paint supply system according to the disclosure in accordance with the second variant of the disclosure, FIG. 3B a detailed representation of the valve arrangement of the paint supply system according to FIG. 3A.

The paint supply system according to the disclosure is used to supply a coating system with a coating agent, preferably a paint used for painting motor vehicle body components. However, with respect to the type of coating agent, the disclosure is not limited to paints, but can in principle also be implemented with other types of coating agents. Furthermore, with regard to the type of coating system, the disclosure is not limited to coating systems for painting motor vehicle body components. Rather, the paint supply system according to the disclosure can also be used to supply coating installations coating other types of components.

the paint supply system according to the disclosure also has at least one ring line for circulation of a coating agent (e.g. paint). Such ring line systems are known from the prior art and are described, for example, in Pavel Svejda: "Prozesse und Applikationsverfahren in der industriellen Lackiertechnik", Vincentz publishing house 2003. It should be mentioned here that in practice several ring lines are usually provided, in which, for example, different colored paints circulate. In the following, however, for the sake of simplicity, only the coating agent extraction from a single ring line is described. It is understood, however, that the coating agent is usually extracted from several ring lines.

The coating agent is extracted from the ring line at a ring line tapping point, which is connected to a consumer (e.g. rotary atomizer) via a tap line.

At this point it should be mentioned that the disclosure is not limited to atomizers (e.g. rotary atomizers) with regard to the consumer. In the context of the disclosure, the consumer may also be another component or assembly that requires the coating agent.

The disclosure is now characterized by the fact that the disturbing settling of the coating agent in the tap line described at the beginning is prevented. For this purpose, the paint supply system according to the disclosure has a device which moves the coating agent alternately forwards and backwards in the tap line in order to prevent the coating agent from settling in the tap line.

This forward and backward movement of the coating agent in the tap line may be accomplished differently in various embodiments of the disclosure. In the following, a first disclosure variant is first described, which for this purpose introduces pressure shocks via the ring line into the tap line, which are reflected in the tap line, resulting in the forward and backward movement of the coating agent in the tap line.

In this first variant of the disclosure, the consumer (e.g. rotary atomizer) extracts the coating agent from the tap line at a tap line tapping point, the tap line being closed downstream of the tap line tapping point and containing at its end a cushion of a compressible medium (e.g. air cushion) which reflects pressure shocks from the pressure line and thereby moves the coating agent standing in the tap line alternately forwards and backwards.

In this first embodiment of the disclosure, the pressure shocks in the tap line are generated by a pressure generator (e.g., coating agent pump) that pumps the coating agent through the ring line. This pressure generator is then controlled by a control unit in such a way that the pressure in the tap line fluctuates in an abrupt manner. This can be done, for example, by alternately switching the pressure generator (e.g. coating agent pump) on and off. As a result, pressure shocks are initially generated in the ring line, which then propagate through the tap line and are reflected at the end of the tap line, which then leads to the forward and backward movement of the coating agent in the tap line.

The desired reflection of the pressure shocks at the end of the tap line is preferably accomplished by a cushion of a compressible medium (e.g., air cushion) at the end of the tap line, the cushion preferably having a volume that is 10%-150%, 20%-130%, or 30%-110% of the volume of the tap line. For the sake of completeness, however, it should also be mentioned that the cushion can also be dispensed with within the scope of the disclosure.

Furthermore, it should be mentioned that the coating agent column in the tap line, together with the elastic cushion at the end of the tap line, forms a vibratory system that has a certain natural frequency. Vibration excitation by the pressure generator is then preferably at the natural frequency or at least close to the natural frequency of this vibratory system in order to move the coating agent column forward and backward in the tap line as intensively as possible. If the pressure generator (e.g. coating agent pump) is switched on and off alternately to generate the pressure shocks, this switching on and off preferably takes place at a switching frequency corresponding to the natural frequency of the vibratory system formed by the coating agent column in the tap line and the cushion at the end of the tap line. For example, the deviation between the excitation frequency of the oscillation excitation by the pressure generator (e.g. coating agent pump) on the one hand and the natural frequency of the oscillatory system formed by the coating agent column in the tap line and the cushion at the end of the tap line on the other hand can be less than 20%, 10%, 5% or 2%.

However, the desired forward and backward movement of the coating agent in the tap line can also be effected differently in a second disclosure variant, so that this second disclosure variant is now described below.

In the second disclosure variant, the tap line opens into a valve arrangement which is connected on the output side, on the one hand, to the consumer (e.g. rotary atomizer) and, on the other hand, to a reservoir. In a first mode of operation, the valve arrangement then directs the coating agent supplied via the tap line to the consumer, so that the consumer can apply the coating agent, for example. In a second mode of operation, on the other hand, the valve arrangement alternately directs the coating agent from the tap line into the reservoir or from the reservoir back into the tap line. In this way, the coating agent standing in the tap line is alternately moved forward and backward.

In one embodiment of this second variant of the disclosure, the reservoir has a pig line that contains a displaceable pig and leads from the valve arrangement to a pig station. The coating agent can be returned from the reservoir back to the tap line by means of a pig which presses the coating agent back into the tap line by pushing the pig from the pig station in the direction of the valve arrangement. Such pigs and pig stations are known per se from the prior art and therefore need not be described in detail.

The pig line can have a pig station at both ends so that the movement of the coating agent is driven by pigs in both directions. Alternatively, however, it is also possible for the pig line to have a pig station only at its distal end. In this case, only the return of the coating agent from the pig line into the tap line is driven by a pig.

In the embodiment with two pig stations at the opposite ends of the pig line, the proximal pig station is connected to the valve arrangement via a connecting line. Here it is advantageous if the connecting line has a smaller line cross-section than the pig line.

It should also be mentioned that two or more pig lines can be connected to the valve arrangement, each forming a reservoir and each leading to a pig station.

In operation, the old coating agent standing in the tap line can then first be transferred to the first pig line. The second pig line is then filled with fresh coating agent from the ring line. In the next step, the old coating agent transferred into the first pig line is then forced back into the tap line and then into the ring line. In the final step, the fresh coating agent transferred to the second pig line is then forced back into the tap line. As a result, the coating agent standing in the tap line is not only moved, but also completely or at least partially exchanged with fresh coating agent from the ring line.

It should also be mentioned that the valve arrangement can have a color changer (e.g. linear color changer), which is connected on the input side via a tap line in each case to several ring lines for different coating agents. In this case, coating agents with different colors usually circulate in the various ring lines, whereby the color changer can then select the desired color on the input side, which is in itself sufficiently known from the prior art. For example, such a linear color changer is known from DE 10 2008 015 258 A1.

In this case, the valve arrangement preferably has a coating agent outlet which is connected to the consumer.

In addition, the valve arrangement may have a pulsed air input and a rinsing agent input for supplying pulsed air and rinsing agent, respectively, the supply being controlled by a controllable pulsed air valve and by a controllable rinsing agent valve, respectively.

Further, the valve arrangement may have a return connection to return media (e.g., coating agent, rinsing agent) into a return, wherein the flow of material into the return may be controlled by a controllable return valve.

In addition, the valve arrangement may include a reservoir port connected to the aforementioned reservoir (e.g., pig line). The material flow through the reservoir connection into the reservoir and back can be controlled here by a controllable reservoir valve.

Furthermore, the valve arrangement may have selector valves to selectively pass the rinsing agent and pulse air through the reservoir port into the reservoir, through the return connection into the return, or through the coating agent outlet to the consumer.

It has already been briefly mentioned above that the consumer is preferably an atomizer (e.g. rotary atomizer) which can be moved, for example, by a multi-axis painting robot, as is known per se from the prior art. Such painting robots are usually designed as articulated arm robots with a proximal robot arm and a distal robot arm. The aforementioned valve arrangement can here be mounted in or on the proximal robot arm or in the distal robot arm.

Furthermore, it should be mentioned that the aforementioned reservoir (e.g., pig line) preferably accommodates a sufficiently large volume, which is preferably 10%-150%, 20%-130%, or 30%-110% of the volume of the tap line.

Furthermore, it should be mentioned that a metering pump can be arranged between the above-mentioned valve arrangement and the consumer (e.g. rotary atomizer).

It should further be mentioned that the disclosure does not only claim protection for the above described paint supply system according to the disclosure. Rather, the disclosure also claims protection for a painting system with such a paint supply system, wherein the painting system can serve, for example, for painting motor vehicle body components.

Finally, the disclosure also claims protection for a corresponding operating method. The individual steps of the operating method according to the disclosure are already apparent from the above description of the paint supply system according to the disclosure, so that reference is made to the above description with regard to the operating method in order to avoid repetition.

The disclosure therefore also includes a control unit which controls the components of the paint supply system according to the disclosure (e.g. paint pump, return valve of the ring line, color changer valves) in such a way that the operating method according to the disclosure is carried out. For this purpose, the control unit can have a control computer on which a control program is stored which executes the operating method according to the disclosure.

In the following, we will first describe the embodiment shown in FIG. 1, which corresponds to a first variant of the disclosure.

In the conventional manner, this paint supply system according to the disclosure initially has a paint container 1 which is filled with paint 2. The paint 2 is extracted from the paint container 1 by a paint pump 3 and pumped through a ring line 4, which in itself is sufficiently known from the prior art.

The paint pump 3 is controlled here by a control unit 5, whereby the control unit 5 can vary the delivery rate of the paint pump 3 and switch the paint pump 3 on and off.

The ring line 5 then opens again into the paint container 1, whereby a controllable return valve 6 is arranged at the end of the ring line 4, which is controlled by a control unit 7. The two control units 5 and 7 can be designed separately or be part of a common control system.

Furthermore, it should be mentioned that instead of the controlled return valve 6, a conventional back-pressure valve can also be provided, which sets a constant coating agent pressure in the ring line 4 upstream of the back-pressure valve, which is also sufficiently known from the prior art. An example of such a ring line system with a back pressure regulator is known from U.S. Pat. No. 7,828,527 B2 which is incorporated herein by reference.

In addition, the drawing shows a rotary atomizer 8, shown here only schematically, which extracts the paint to be applied from the ring line 4 via a tap line 9 at a ring line tapping point 10. The paint application by the rotary atomizer is controlled by a main valve 11, shown only schematically.

In contrast to the prior art, the tap line 9 is guided through the rotary atomizer 8, whereby the rotary atomizer 8 takes the paint to be applied from the tap line 9 at a tap line tapping point 12.

Furthermore, it should be mentioned that the tap line 9 is closed at its end and contains an air cushion 13 there, which serves to reflect pressure shocks, as will be described below.

Indeed, if the rotary atomizer 8 does not extract any paint from the tap line 9, the paint will stand in the tap line 9. There is then a risk that the paint will settle in the tap line 9 or change its viscosity during longer downtimes, which is also undesirable. The disclosure therefore provides for the paint in the tap line 9 to be moved forwards and backwards during such standstill periods in order to prevent the disturbing settling of the paint in the tap line. For this purpose, the control unit 5 controls the paint pump 3 in such a way that the paint pump 3 is alternately switched on and off. This first generates pressure shocks in the ring line 4, which then propagate via the tap line 9 to the end of the tap line 9, where the pressure shocks are then reflected by the elastic air cushion 13. The result is that the coating standing in the tap line 9 is moved alternately forwards and backwards.

It should be mentioned here that the paint supply system with the paint column in the tap line 9 and the elastic air cushion 13 forms an oscillatory system. To achieve the most intensive possible backward and forward movement of the paint in the tap line, the excitation frequency of the pressure shocks should be adapted to the natural frequency of the oscillatory system. For this purpose, the control unit 5 controls the paint pump 3 with an appropriate excitation frequency.

Figure 2:
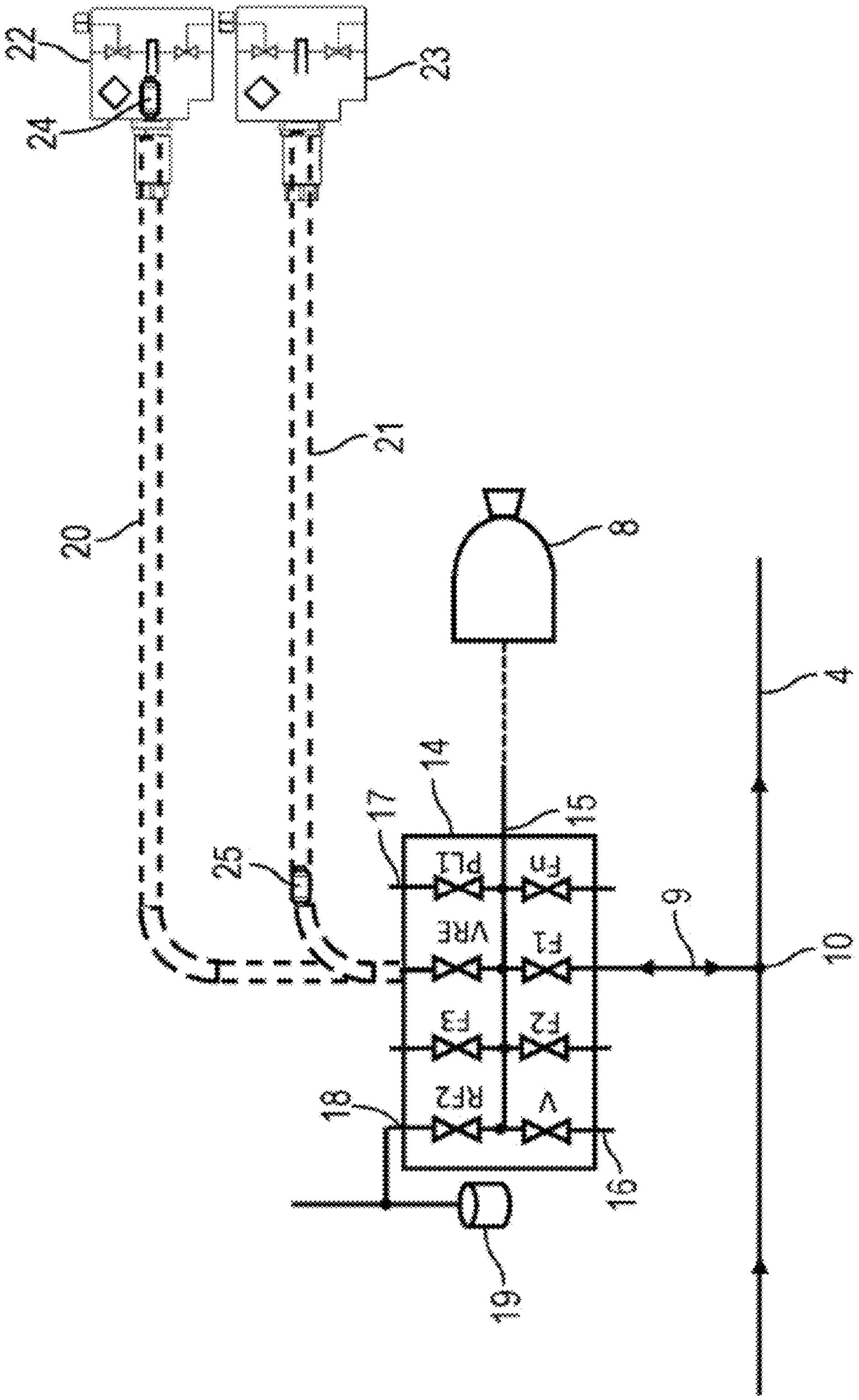

In the following, a second variant is described, which is shown in FIG. 2. However, this variant is partly identical with the first variant described above. To avoid repetition, reference is therefore also made to the above description of the first variant, whereby the same reference signs are used for corresponding details.

This second variant is characterized first of all by a color changer 14 which has several color valves F1-Fn on the input side, each of which is connected to a ring line. For simplicity, only the ring line 4 is shown here, which is connected to the color valve F1 of the color changer 14 via the tap line 9. In fact, however, the other color valves F2-Fn of the color changer 14 are also connected via a tap line (not shown) to a ring line (not shown).

In addition, the color changer has a coating agent outlet 15 to which the rotary atomizer 8 is connected.

Furthermore, the color changer 14 has a rinsing agent connection 16 for supplying rinsing agent, the supply of rinsing agent via the rinsing agent connection 16 being controlled by a rinsing agent valve V in the color changer 14.

Furthermore, the color changer 14 has a pulsed air connection 17 for supplying pulsed air, the pulsed air supply being controlled via the pulsed air connection 17 by a pulsed air valve PL1 in the color changer 14.

Furthermore, the color changer 14 has a return connection 18 for returning media (rinsing agent, pulse air, paint) into a return 19, whereby the material flow into the return 19 is controlled by a return valve RF2 in the color changer 14.

This variant is characterized by the fact that the color changer 14 additionally has a reservoir valve VRE in order to be able to direct paint standing in the tap line 9 into a reservoir. The reservoir is formed by two pig lines 20, 21, each of which opens at its distal end into a pig station 22, 23. A pig 24, 25 can be displaced in each of the pig lines 20, 21, the movement of the pigs 24, 25 from the pig stations 22, 23 in the direction of the color changer 14 being effected by compressed air, as is known per se from the prior art.

In the following, the mode of operation of this second variant will now be briefly described.

If the rotary atomizer 8 is at a standstill for a longer period of time and thus does not require any coating, there is a risk that the coating standing in the tap line 9 will settle or at least change its viscosity. In this case, the reservoir valve VRE is then first opened, and the old paint standing in the tap line 9 is transferred to the pig line 20.

In a second step, fresh paint is then transferred from the ring line 4 through the reservoir valve VRE into the other pig line 21.

In the next step, the pig 24 then pushes the old paint located in the pig line 20 back into the tap line 9 and finally also into the ring line 4.

In a further step, the pig 25 then presses the fresh paint located in the pig line 21 back into the tap line 9.

As a result, the old paint in the tap line 9 is completely or at least partially replaced by fresh paint from the ring line 4.

Figure 3A:
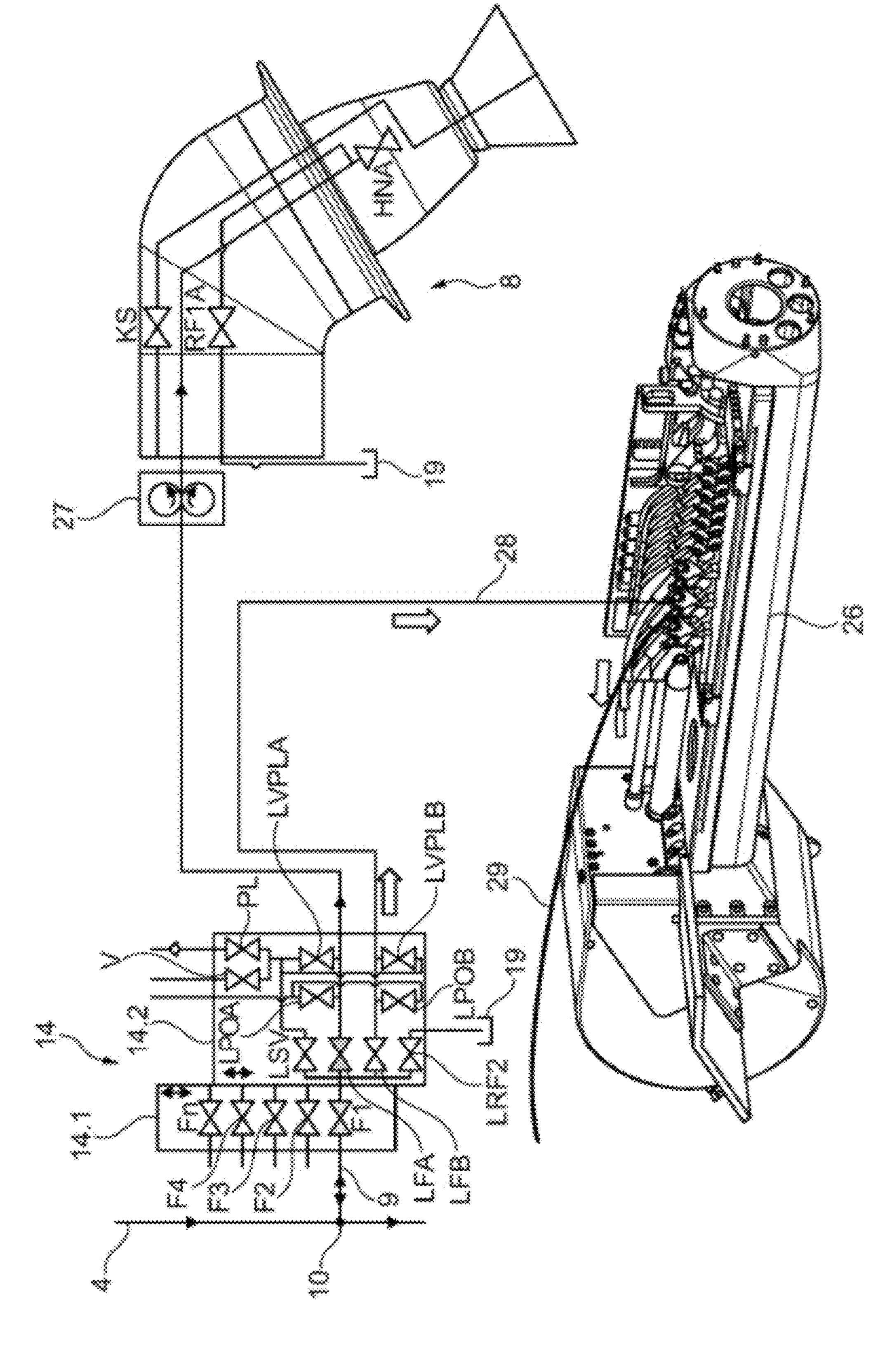
Figure 3B:
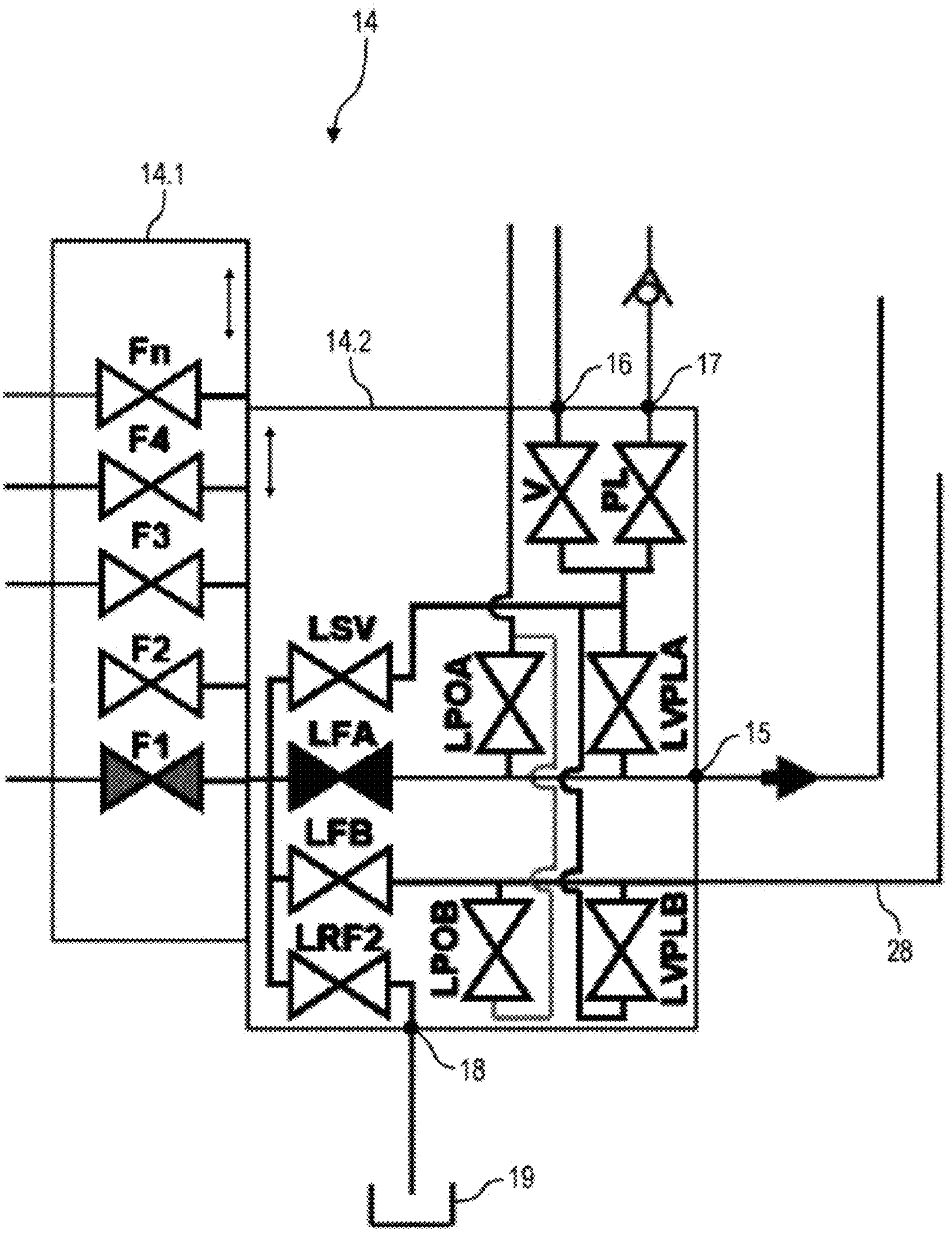

In the following, the embodiment according to FIGS. 3A and 3B will now be described, which also corresponds to the second variant and is a modification of the embodiment according to FIG. 2. In order to avoid repetitions, reference is therefore made to the above description in a supplementary manner, with the same reference signs being used for corresponding details.

First of all, it should be mentioned that the color changer 14 is designed as a linear color changer and is arranged in a distal robot arm 26 of a painting robot. The color changer 14 here has two valve assemblies 14.1, 14.2 which are displaceable relative to one another along the double arrows in order to select one of the color valves F1-Fn of the valve arrangement 14.1 for material extraction.

The coating agent outlet 15 of the valve arrangement 14.2 of the color changer 14 is here connected to the rotary atomizer 8 via a metering pump 27, the material delivery by the rotary atomizer 8 being controlled by a conventional main needle valve HNA in the rotary atomizer 8.

In addition, the rotary atomizer 8 has here a return valve RF1A and a short flush valve KS, as known per se from the prior art.

The valve arrangement 14.2 also has a reservoir valve LFB, which corresponds to the reservoir valve VRE as shown in FIG. 2. The reservoir valve LFB allows the paint standing in the tap line 9 to be directed into a reservoir consisting of a connecting line 28 and a pig line 29, the pig line 29 having a larger line cross-section than the connecting line 28. The pig line 29 leads to a pig station not shown, which allows the paint transferred into the reservoir to be pressed back into the tap line 9, as already described above with reference to FIG. 2.

In addition, the valve arrangement 14.2 still has selection valves LVPLA, LVPLB, LSV which allow the rinsing agent and the pulsed air to be selectively directed into the reservoir (i.e. the connecting line 28 and the pigging line 29), into the return line 19 or to the rotary atomizer 8.

Figure 4:
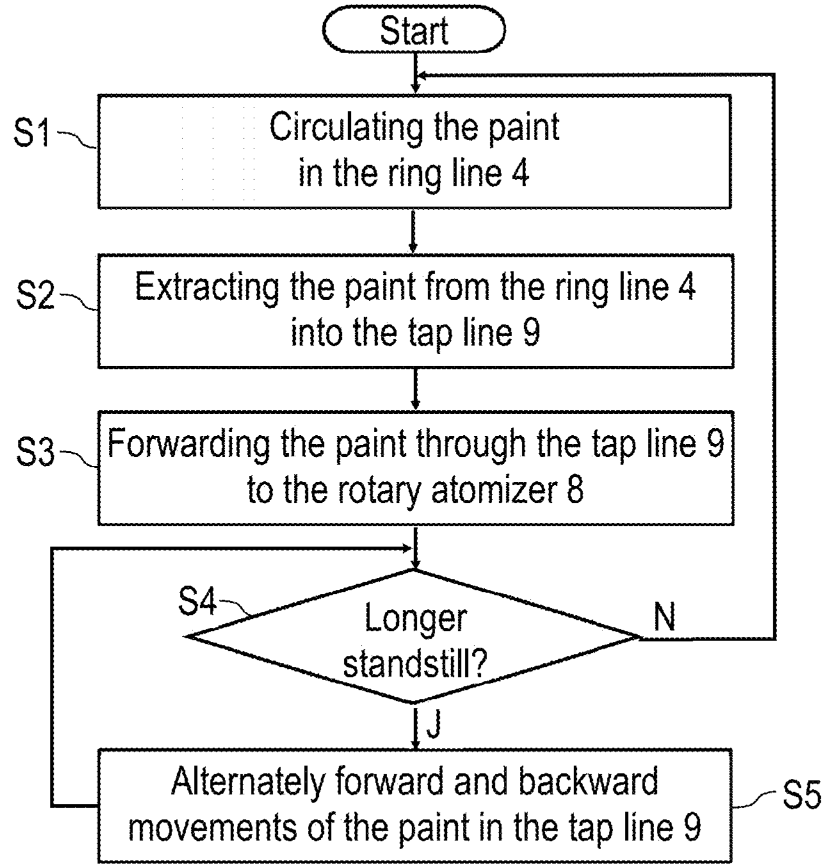
FIG. 4 shows the operating method according to the disclosure in the form of a flow chart.

In the following, the flow diagram according to FIG. 4 will now be described, which shows the operating method according to the first variant in schematic form.

In a step S1, the paint is circulated in the ring line 4.

In a step S2, the paint is then extracted from the ring line 4 into the tap line 9 to the rotary atomizer 8. In the next step S3, the paint is then conveyed through the tap line 9 to the rotary atomizer 8.

In a step S4, it is then continuously checked whether there is a longer standstill in which the rotary atomizer 8 does not require any paint.

If this is the case, the paint is moved alternately forwards and backwards in the tap line 9 in a step S5 in order to prevent the paint from settling in the tap line.

The disclosure is not limited to the preferred embodiments described above. Rather, a large number of variants and variations are possible which also make use of the inventive idea and therefore fall within the scope of protection. In particular, the disclosure also claims protection for the subject matter and the features of the dependent claims independently of the claims referred to in each case and in particular also without the features of the main claim. The disclosure thus comprises different aspects of the disclosure which enjoy protection independently of each other.

LIST OF REFERENCE SIGNS

1 Paint container
2 Paint
3 Paint pump
4 Ring line
5 Control unit for paint pump
6 Return valve
7 Control unit for return valve
8 Rotary atomizer
9 Tap line
10 Ring line tapping point
11 Main valve in rotary atomizer
12 Tap line tapping point
13 Air cushion at the end of the tap line
14 Color changer
14.1, 14.2 Valve assemblies of the color changer
15 Coating agent outlet of the color changer
16 Rinsing agent connection of the color changer
17 Pulsed air connection of the color changer
18 Return connection of the color changer
19 Return
20, 21 Pig lines
22, 23 Pig stations
24, 25 Pigs
26 Robot arm
27 Metering pump
28 Connecting line
29 Pig line
14.1, 14.2 Valve assemblies of the color changer
F1-Fn Color valves of the color changer
HNA Main needle valve in the rotary atomizer
KS Short rinse valve in the rotary atomizer
LFB Reservoir valve
LVPLA Selection valve
LVPLB Selection valve
LSV Selection valve
PL Pulsed air valve
PL1 Pulsed air valve
RF1A Recirculation valve in rotary atomizer
RF2 Recirculation valve of the color changer
V Rinsing valve of the color changer
VRE Reservoir valve of the color changer

The invention claimed is:

1. An operating method for a paint supply system for a coating installation, comprising the following steps:

a) circulating a coating agent in a ring line;

b) extracting the coating agent from the ring line at a ring line tapping point;

c) forwarding the coating agent from the ring line tapping point through a tap line to a consumer; and d) moving the coating agent standing in the tap line forward and backward in order to avoid settling of the coating agent in the tap line, wherein moving the coating agent forward and backward in the tap line includes at least one pig line which contains a displaceable pig and leads from a valve arrangement to a pig station, and wherein the pig station moves the displaceable pig for returning the coating agent from the at least one pig line into the tap line from the pig station in a direction of the valve arrangement.

2. The operating method according to claim 1, wherein a) the consumer is adapted to extract the coating agent from the tap line at a tap line tapping point, b) the tap line is closed downstream of the tap line tapping point, c) the tap line contains a cushion of a compressible medium at its end, and d) pressure shocks are generated in the tap line which are reflected by the cushion at the end of the tap line and thereby move the coating agent standing in the tap line forward and backward.

3. The operating method according to claim 2, wherein a) the coating agent is pumped through the ring line by a coating agent pump, and b) the pressure shocks in the tap line are generated by switching the coating agent pump on and off.

4. The operating method according to claim 1, wherein a) the tap line opens into a valve arrangement, b) a reservoir is connected to the valve arrangement, c) the valve arrangement is connected on the outlet side to the consumer, d) in a first operating mode, the valve arrangement conducts the coating agent from the tap line to the consumer, and e) the valve arrangement in a second mode of operation for moving the coating agent forward and backward in the tap line e1) directs the coating agent from the tap line into the reservoir, and e2) directs the coating agent from the reservoir back into the tap line.

5. The operating method according to claim 4, wherein a) the reservoir comprises a pig line containing a displaceable pig and leading from the valve arrangement to a pig station, and b) the pig station moves the pig for returning the coating agent from the pig line into the tap line from the pig station in the direction of the valve arrangement.

6. An operating method for a paint supply system for a coating installation, comprising:

a) circulating a coating agent in a ring line;

b) extracting the coating agent from the ring line at a ring line tapping point;

c) forwarding the coating agent from the ring line tapping point through a tap line that opens into a valve arrangement connected on an outlet side to a consumer; and d) in a first operating mode, the valve arrangement conducts the coating agent from the tap line to the consumer, and in a second operating mode for moving the coating agent forward and backward in the tap line, the valve arrangement directs the coating agent from the tap line into a reservoir connected to the valve arrangement, and directs the coating agent from the reservoir back into the tap line;

wherein the reservoir comprises a pig line containing a displaceable pig and leading from the valve arrangement to a pig station, and the pig station moves the pig for returning the coating agent from the pig line into the tap line from the pig station in the direction of the valve arrangement.

* * * * *